Jan. 17, 1939.  E. M. ERB  2,144,486
LOCATING DEVICE
Filed April 28, 1936   2 Sheets-Sheet 1
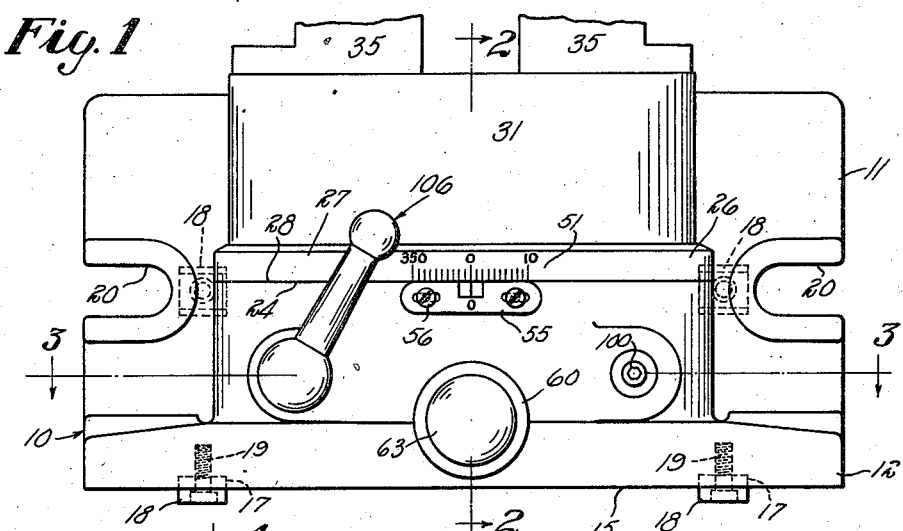
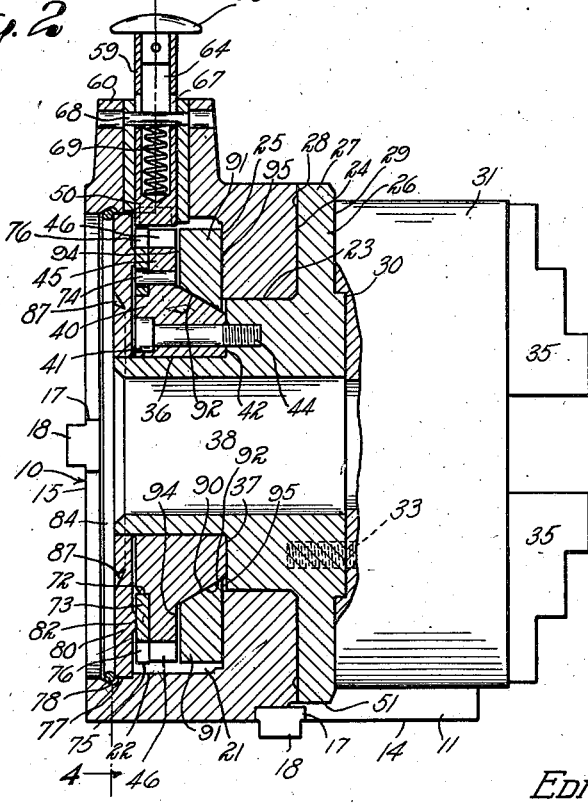
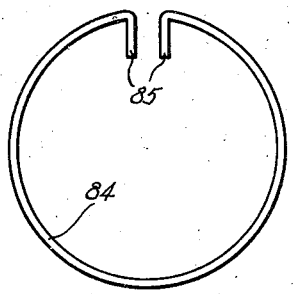
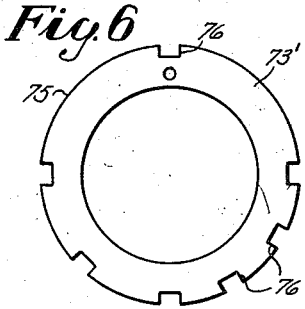
Inventor
EDMUND M. ERB
By N. Clay Lindsey
Attorney

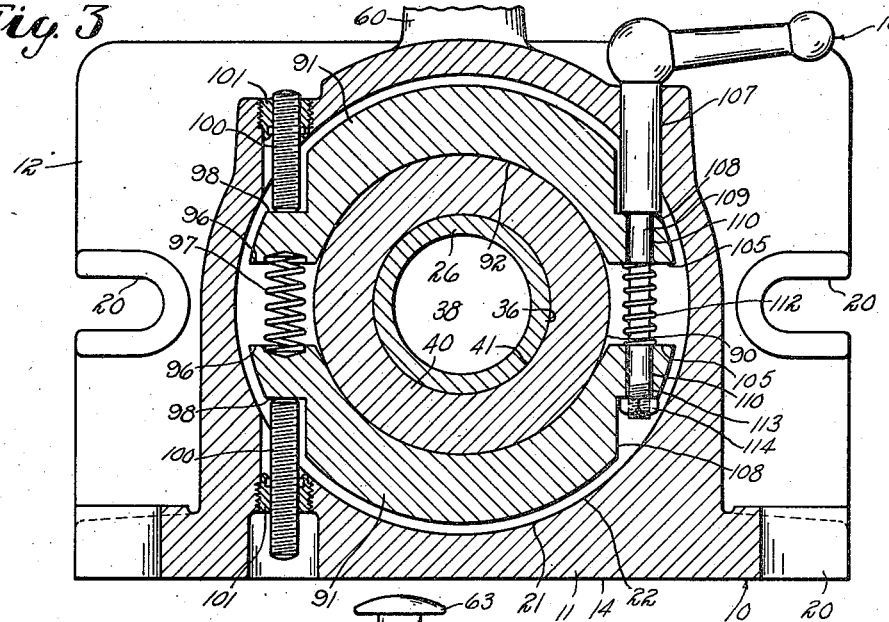
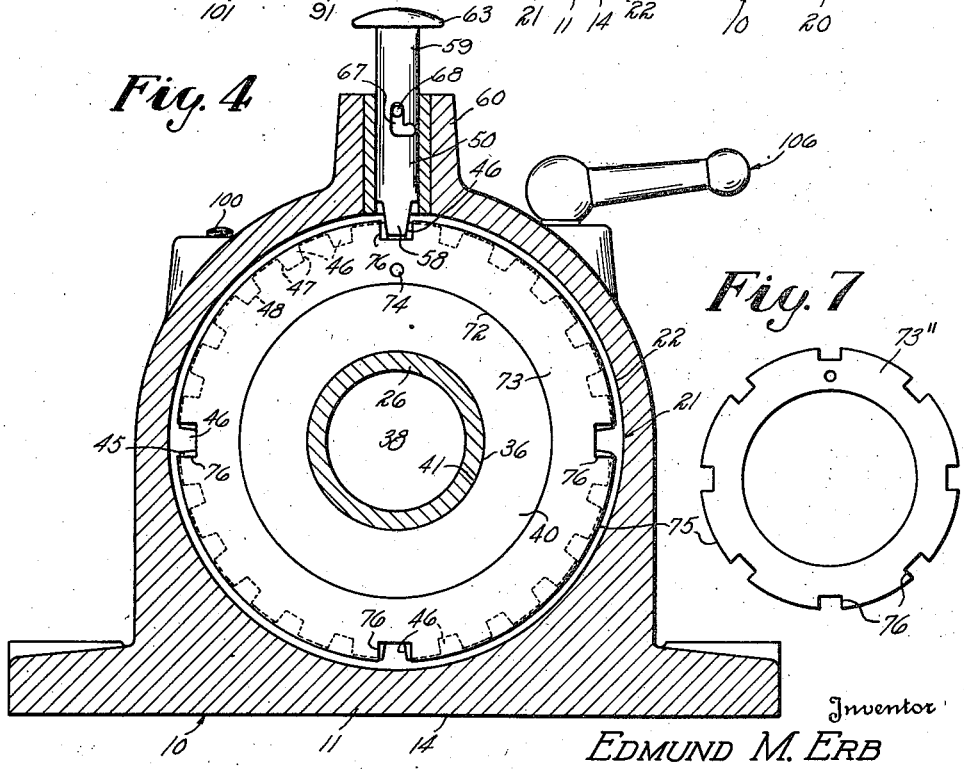
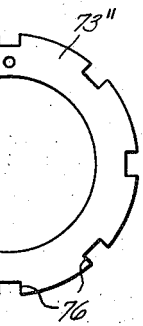

Patented Jan. 17, 1939

2,144,486

UNITED STATES PATENT OFFICE 2,144,486

LOCATING DEVICE

Edmund M. Erb, West Hartford, Conn., assignor to The Hartford Special Machinery Company, Hartford, Conn., a corporation of Connecticut Application April 28, 1936, Serial No. 76,784

10 Claims. (Cl. 90—60)

This invention relates to work locating devices and, more particularly, to an indexing device adapted to be employed in conjunction with a work holder for angularly positioning a work piece.

An aim of the present invention is to provide a portable work locating device adapted to be used on various machine tools and arranged to angularly and positively locate a work holder, such as a chuck, in various indexed positions or in angularly adjusted positions which may be preset at the will of the operator so that desired machining operations may be successively performed in predetermined positions on the same work piece.

A further object of this invention is to provide an indexing mechanism for a chuck or other work holding device which may be selectively employed at the will of the operator to successively position a work piece through predetermined but adjustable extents of angular movement.

It is a further object of this invention to provide a work indexing mechanism having a plurality of easily interchangeable locating devices arranged to index a work piece through successive predetermined extents.

To the accomplishments of these and other objects which will be apparent from the following description of my invention, I have provided a portable work indexing device which may be utilized in conjunction with any machine tool, such, for example, as a milling machine, to angularly and successively prelocate various machining positions on the work so that holes may be produced therein in desired positions and with extreme accuracy. As herein illustrated, I have shown a work chuck arranged to be indexed about its axis to various positions, but it will be evident that the chuck may be replaced by any other suitable work holding device and the entire mechanism may be conveniently employed in conjunction with any machine tool so that various machining operations may be produced in desired positions on the same work piece.

In the drawings, wherein like parts are indicated by like numerals:

Figure 1 is a plan view of my invention showing a chuck indexed to a zero position;

Fig. 2 is a fragmentary sectional view taken substantially along the line 2—2 of Fig. 1 and showing the index mechanism locked in a non-rotative position;

Fig. 3 is a sectional view taken substantially along the line 3—3 of Fig. 1 and showing the clamping mechanism;

Fig. 4 is a sectional view taken along the line 4—4 of Fig. 2 and showing an end view of the index mechanism in non-rotative position;

Fig. 5 shows the clamping ring employed to secure the removable selector plates within my device; and Figs. 6 and 7 show selector plates adapted to be demountably associated with my chuck indexing mechanism.

Referring to the drawings which illustrate one embodiment of my invention showing a standard form of chuck arranged to be indexed about its axis to various selective positions, I have provided a base, generally indicated at 10, and having flanged portions 11 and 12 respectively provided with supporting faces 14 and 15 disposed at right angles to each other. These faces have suitable recessed portions 17 arranged to removably receive guiding keys 18 secured in position in any suitable manner, as by means of screws 19. The keys on each face are preferably located in alignment with each other as shown in Fig. 1 and arranged to slidably fit within suitable grooves in the top of a machine tool table to aid in locating and securing the base in required position. Each of the flanges 11 and 12 is further provided with a pair of substantially U-shaped aligned apertures 20 whereby the assembly may be suitably and removably clamped in position.

A counterbored hole 21, extending through the base and axially disposed at right angles to face 15, has an enlarged bore 22 adjacent to face 15 and terminates at its other end in a reduced bore 23 adjacent to an annular surface 24 disposed parallel to surface 15. Intermediate of bores 22 and 23, the base has an annular face 25 disposed in a plane parallel to faces 15 and 24. An indexible hub 26 is journalled intermediate of its ends for free rotation within bore 23 and is provided with an enlarged flange 27 having an annular face 28 adapted to seat against surface 24 and a parallel annular face 29 terminating in a reduced protruding hub 30 arranged to coaxially receive a standard type of work holder such as a chuck 31 rigidly but removably secured thereto in any suitable manner, as by means of screws 33, one of which is shown in Fig. 2. Chuck 31 is provided with a plurality of radially disposed clamping jaws 35 arranged to clamp against a work piece and support it coaxially with the member 27 for integral rotation therewith. It will be appreciated, of course, that the chuck may be removed by loosening screws 33, and any other suitable type of work holder may be employed thereinstead without deviating from the scope of the present invention.

The rearward end of hub 26 is provided with a reduced coaxial cylindrical surface 36 terminating at its inner end in an annular face 37 disposed parallel to face 28. A cylindrical bore 38 extends centrally through hub 26 whereby a suitable bar may be inserted therethrough to aid in removing work pieces from the work holder whenever desired. An annular index plate 40, having an inner bore 41 journalled on surface 36, is provided with an inner end face 42 secured in abutting driving relation with member 26 by means of spaced screws 44 passing through plate 40 and threadably received in member 26. This plate is further provided with an outwardly extending flange 45 having uniformly spaced peripheral grooves or recesses 46 therein and extending parallel to the axis of bore 22. These grooves 46 which serve as index stations are preferably provided with opposed tapering side faces 47 and bottom faces 48, as shown in Fig. 4, and are arranged to receive a manually locatable locking finger 50 in mating engagement therewith to prevent rotation of chuck 31 and to angularly locate it with respect to base 10.

To aid in locating the chuck at its various angular positions, a plurality of graduations running from zero to 360° are provided on the peripheral rim 51 of member 26, and an index plate 55 having a suitable zero indicating line is secured as by screws 56 to base 10. Screws 56 pass through slotted holes in member 55 to facilitate the initial adjustment of chuck 31 during the assembly of the mechanism.

In the present instance, the grooves 46 are arranged in uniform spaced relation throughout the entire periphery of flange 45, and, as illustrated, an index movement from one groove to an adjacent groove results in an angular movement of the chuck through 15°. It will be appreciated, however, that the grooves may be spaced any required distances apart to provide a desired indexing operation. Finger 50 is provided at its lower end with a seating portion 58 adapted to fit into mating engagement with the sides of grooves 46 so that chuck 31 and the work supported therein will be angularly located precisely as required. Finger 50 is preferably cylindrical in form having a body portion 59 slidably journalled in a sleeve secured within a protruding hub 60 of base 10. An operating handle 63 is secured to the top of body portion 59 and an internal bore 64 is provided coaxial therewith through the greater portion of its length as shown in Fig. 2.

Intermediate of the ends of body portion 59 I have provided a pair of diametrically disposed bayonet sockets 67 arranged to slidably receive a transverse pin 68 mounted within the opposite sides of hub 60; and a coiled spring 69 is compressively engaged between pin 68 and the bottom of bore 64 tending to urge finger 50 downwardly into locking engagement with one of the grooves 46. When it is desired to move the finger out of locking engagement with one of said grooves, it is simply necessary to lift it therefrom and turn bayonet sockets 67 into locking engagement with transverse pin 68 whereby seating portion 58 will be withheld from engagement with index plate 40, as shown in Fig. 2. It will thus be appreciated that by selectively engaging portion 58 within grooves 46, various predetermined extents of angular movement may be imparted to the work dependent upon the distances between said grooves.

In order to index the work through successively predetermined angular movements, I have further provided a plurality of demountable and interchangeable selector plates, three of which are herein shown at 73, 73' and 73''. These plates are adapted to be easily secured in driving relation with flange 45 so that an operator need not depend upon the graduations on flange 27 with relation to plate 55 when indexing work through predetermined angular extents provided the correct selector plate is employed. The rearward end of plate 40 terminates in a reduced hub 72 coaxial with flange 45 and arranged to support one of the interchangeable annular selector plates 73, 73' and 73'' which is secured in driving engagement therewith by means of a locating pin 74. I preferably mount pin 74 in plate 40 so that it extends therefrom and slidably fits within a hole in the selector plate. It will be understood, however, that a locating pin could be secured within each of the interchangeable plates and arranged for engagement within a hole in plate 40. Each selector plate has a peripheral face 75 of slightly greater diameter than that of flange 45 and of slightly lesser diameter than bore 22. A series of peripherally spaced notches 76 are cut in each of the selector plates, and these notches are slightly greater in width than grooves 46, each notch being adapted to substantially align with one of said grooves.

The plate 73 illustrated in Fig. 4 is provided with four notches 76 angularly spaced 90° apart relative to the axis of chuck rotation, and locating pin 74 serves to preset said plate so that each of the notches 76 extend slightly to either side of, but in substantial alignment with, a corresponding groove 46. Selector plate 73' is provided with seven non-uniformly spaced notches 76, and plate 73'' is shown having eight uniformly spaced notches. Hence, it will be understood that my invention includes a plurality of easily interchangeable selector plates having one or more notches 76 arranged to substantially align with the various grooves 46 to selectively control the extent of angular work holding movement between locking positions of finger 50 in grooves 46 whereby a work piece may be successively indexed through the same or different predetermined angular extents, each of which is a multiple of the center distance between two adjacent grooves 46.

The outer end of bore 22 terminates in a slightly enlarged bore 77 having an annular groove 78 disposed intermediate of its ends. A disk 80, slidably received within bore 77 and internally journalled on surface 36, is provided with a laterally protruding annular portion 82 engageable with the outer side face of the selector plate and maintained thereagainst by means of a removable spring ring 84 having two inwardly extending fingers 85. Ring 84 is preferably composed of a suitable resilient material such as spring steel and arranged to expand outwardly into groove 78 to lock disk 80 and the selector plate in position. It will thus be appreciated that the selector plates may be quickly and easily interchanged with other plates having differently spaced notches 76 simply by compressing the fingers 85 towards each other and removing locking ring 84. Disk 80 is provided with a pair of notches 87 in which an operator may easily insert his fingernails to remove and replace the disk.

In view of the fact that notches 76 are in the same relative spaced relation as certain predetermined grooves 46 and each notch is of slightly greater extent than the cooperating groove 46, it will be apparent that in performing an indexing operation, it is simply necessary for the machine operator to first insert the selector plate having the required spacing of notches 76, and thereafter handle 63 may be lifted to disengage portion 58 from its seated position, after which the chuck may be freely rotated and the bottom of portion 58 will ride on the periphery of the selector plate until portion 58 is again spring pressed into seating engagement with the sides of a groove 46 at the next indexing position. For example, as shown in Fig. 4, the plate 73 serves to aid in indexing the work holder through successive extents of 90° or through intervals of six grooves, each of which is spaced from an adjacent groove by an extent of 15°.

When the work has been rotated to its desired indexed positions, a clamping mechanism is operated to rigidly secure the work holder in said position and prevent rotary thrusts from being transmitted to the index mechanism. To accomplish this, faces 37 and 28 are disposed slightly closer to each other than faces 24 and 25 so that clamping mechanism, hereafter to be described, may frictionally engage face 25 but will not be opposed in its clamping operation by face 37. The inner side of plate 40 between the flange 45 and surfaces 42 is provided with a conical peripheral face 90 adapted to be engaged by two arcuate brake shoes 91 having arcuate seating faces 92 and substantially parallel disposed side faces 94 and 95 and substantially parallel end faces 96. It will be observed that the brake shoes 91 are of a width only slightly less than the distance between the flange 45 and face 25 so that these shoes substantially fill the space between the index plate and the base 10 and thus constitute filler pieces or end bearings for preventing appreciable axial movement of the chuck 31. The brake shoes thus serve two functions, namely, that of securely clamping the chuck against rotation when the brake shoes are applied, and to substantially prevent any appreciable axial movement of the chuck body when the brakes are released. When the brakes are released, the chuck body, of course, may be indexed, as previously described, but in this indexing movement, the clearance between the casting, the chuck body, and the brake shoes is so small that excessive endwise movement of the chuck is prevented. As shown in Fig. 3, the opposed left-hand ends 96 of the brake shoes are compressively engaged by a coiled spring 97 seated within suitable recesses, and stepped portions 98 are provided in the peripheral contours thereof whereby adjustment screws 100 threaded within bushings 101 in base 10 serve to prelocate the shoes and provide suitable adjustment therefor.

The opposite ends of the brake shoes terminate in opposed parallel end faces 105, and a locking member, generally indicated at 106 and journalled within base 10 at 107, engages within stepped portions 108 and has a reduced portion 109 loosely passing through holes 110. A coiled spring 112 slidably mounted on reduced portion 109 compressively engages the opposed faces 105 and cooperates with spring 97 in aiding the release of the brake shoes from surface 90. The lower end of reduced portion 109 terminates in a threaded portion 113 having a nut 114 thereon locked in non-rotative engagement with stepped portion 108. It will thus be appreciated that when locking member 106 is rotated to close the distance between surfaces 105, the brake shoes will be urged towards each other and slidably move downwardly on conical face 90 into simultaneous frictional locking engagement with face 90 and face 25 on base 10, and the extent of braking operation may be easily controlled by pre-adjustment of screws 100.

In the event that the machine operator does not desire to index his chuck 31 to a predetermined position as located by the cooperating plates 40 and 73 and locking portion 58, it will be appreciated that locking finger 50 may be retracted and locked out of engagement by means of bayonet sockets 67, and the work holder may thereafter be freely rotated through the desired angle as indicated by the graduations on flange 27 in alignment with the index line on plate 55, after which the brake may be applied by means of rotation of member 106 to positively secure the work holder in its adjusted position. It will be noted that the clamping action of the brake shoes in engagement with surfaces 90 and 25 serve to positively lock the brake without tending to impart any rotary movement to the preadjusted parts. Hence, the clamping movement of brake shoes 91 has no tendency to alter any present angular position of the work.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A work locating device comprising a base, an indexable unit journalled on the base and having a work holder secured thereto, said unit including a rotatable index plate provided with a plurality of peripherally spaced recesses, a movable member slidably mounted on the base and arranged for selective engagement with said recesses to angularly locate the work holder and lock it in position, an annular selector plate removably secured to the index plate for integral rotation therewith, said selector plate being located in the path of movement of the movable member and having peripherally spaced apertures aligned with certain predetermined recesses whereby the movable member is constrained to be selectively engageable only with said predetermined recesses and the work holder may be successively indexed through predetermined extents.

2. In a device for rotatably indexing work, the combination of a manually rotatable work holder, an indexable unit secured thereto and journalled for rotation in a base, graduations on the base and indexable unit, said unit including an annular index plate having a plurality of peripherally spaced recesses, a manually operable member slidably journalled in the base and selectively engageable with said recesses to secure the work holder in various indexed positions, means resiliently urging said member into engagement with the plate, means to lock said member out of operable position, a selector disk removably secured to said index plate and located in the path of movement of said manual member, said disk limiting the selective engagement of said member to certain predetermined recesses, and means independent of the manually operable member to lock the indexable unit against rotation in any preset position.

3. A work locating device comprising a work holder, a base therefor, means rotatably supporting said holder on the base including a member journalled in the base, an annular index plate secured for integral rotation with said member, said index plate having a plurality of peripherally spaced recesses, a manually operable member slidably journalled in the base and selectively engageable with said recesses to secure the work holder in desired indexed positions, a locating disk removably secured to the index plate, said disk having a peripheral face located in the path of movement of the manually operable member, and a plurality of peripherally spaced notches in said disk in substantial alignment with certain of said recesses in the index plate, said notches being of greater width than the correspondingly aligned recesses so that said manually operable member may only operatively engage within said recesses, and the work may be indexed to successive predetermined positions.

4. In a rotatable work locating device, a base, an indexible unit rotatably supported therein, selector means for locating said unit in various predetermined positions, said unit including a rotatable member having a tapered conical face, a graduated scale on the unit adapted to align with an index on the base to indicate the extent of indexed movement, a pair of brake shoes movably supported within the base for engagement with said conical face, means normally tending to maintain said shoes out of braking engagement, adjustable means associated with one end of the shoes to preset said brake shoes relative to their braking position, and a manually operable member journalled in the base and operatively connected to the other ends of the shoes to shift said brake shoes into operative position and maintain the rotatable unit in any desired angular setting irrespective of the respective positions of the indexable unit and selector means.

5. A work locating device comprising a base, an indexable unit journalled on the base and having a work holder secured thereto, said unit including a rotatable index plate provided with a plurality of spaced stations, a movable member slidably mounted on the base and selectively engageable with the stations to lock the index unit against rotation and to angularly locate the work holder in predetermined positions, and means rotatable with the index plate as a unit and removably secured to the index plate and located in the path of movement of said movable member, said means preventing engagement of the movable member with the index plate except at certain predetermined stations.

6. In a work locating device having a base, an indexable unit journalled on the base and provided with a work holder, said unit including an index plate having a plurality of spaced stations, a movable member slidably mounted on the base and selectively engageable with said stations to angularly locate the work holder, and station selector controlling means comprising a selector plate of not less than equal diameter to the index plate, and removably secured to the index plate for integral rotation therewith, said plate limiting the engagement of the movable member to certain predetermined stations whereby the work holder may be successively indexed through predetermined extents.

7. In a work locating device having a base, an indexable unit journalled on the base and provided with a work holder, said unit including a rotatable index plate having a plurality of stations thereon, a manually operable member slidably mounted within the base and selectively engageable with said stations to locate the unit in various indexed positions, a selector plate, means removably securing the plate in a predetermined position on the index plate for rotation therewith, said plate lying in the path of movement of the movable member and preventing engagement of said member with certain predetermined stations, said plate being provided with peripherally spaced locating portions cooperating with certain other stations and limiting the engagement of the manual operating member to said other stations, and removable means locked within the base to maintain said removable selector plate positioned on said index plate.

8. In combination, a work locating device having a base, an indexable unit journalled on the base and having a work holder, said unit including a rotatable index plate provided with a plurality spaced stations, a movable member on the base and selectively engageable with said stations to angularly locate the work holder in predetermined positions, means removably associated with the index plate and located in the path of movement of said movable member to prevent engagement of the movable member with the index plate except at certain predetermined stations, a brake mechanism associated with the index plate to fricitionally lock it against movement, means normally tending to maintain the brake mechanism out of braking engagement, and a manually operable member arranged to shift the brake members into locking engagement with the plate and prevent rotation of the index mechanism.

9. In a rotatable work locating device, a base, indexing mechanism journalled in the base, said indexing mechanism and said base having opposed spaced apart parallel surfaces and said indexing mechanism having a conical surface intermediate of said opposed parallel surfaces, a brake member positioned in and substantially filling the space between said indexing mechanism and said base, said brake comprising a ring having opposed parellel surfaces and an inner conical surface, said parallel surfaces of the brake mating with the opposed parallel surfaces of the indexing mechanism and the base, and said conical surface mating with the conical surface of the indexing mechanism, and a manually operable member arranged to shift said brake member into frictional binding engagement with said index mechanism to prevent rotation thereof.

10. In a rotatable work locating device, a base, indexing mechanism journalled in the base, said indexing mechanism and said base having opposed spaced apart parallel surfaces and said indexing mechanism having a conical surface intermediate of said opposed parallel surfaces, a brake member substantially filling and positioned in the space between said base and indexing mechanism and comprising a split ring having opposed parallel surfaces and an iinner conical surface, said parallel surfaces mating with the parallel surfaces of the indexing mechanism and the base, and said conical surface mating with the conical surface of the indexing mechanism, means normally tending to maintain said conical surfaces out of contact, and a manually operable member arranged to shift said brake member into frictional binding engagement with said index mechanism to prevent rotation thereof.

EDMUND M. ERB.